United States Patent
Iwamura et al.

(10) Patent No.: US 8,498,270 B2
(45) Date of Patent: Jul. 30, 2013

(54) MOBILE STATION, BASE STATION, AND METHOD OF REPORTING WIRELESS CHANNEL QUALITY

(75) Inventors: Mikio Iwamura, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 423 days.

(21) Appl. No.: 12/159,057

(22) PCT Filed: Dec. 26, 2006

(86) PCT No.: PCT/JP2006/325975
§ 371 (c)(1),
(2), (4) Date: Sep. 23, 2008

(87) PCT Pub. No.: WO2007/077846
PCT Pub. Date: Jul. 12, 2007

(65) Prior Publication Data
US 2010/0002595 A1    Jan. 7, 2010

(30) Foreign Application Priority Data
Dec. 28, 2005 (JP) ................................. 2005-379987

(51) Int. Cl.
*H04W 4/00* (2009.01)
(52) U.S. Cl.
USPC ........ 370/332; 370/252; 370/311; 455/452.2; 455/574
(58) Field of Classification Search
USPC ....... 370/252, 311, 328, 329–339; 455/452.2, 455/574
See application file for complete search history.

(56) References Cited

U.S. PATENT DOCUMENTS

| | | | |
|---|---|---|---|
| 6,993,294 B2 | 1/2006 | Nobukiyo et al. | |
| 2003/0073409 A1* | 4/2003 | Nobukiyo et al. | 455/67.1 |
| 2005/0201296 A1* | 9/2005 | Vannithamby et al. | 370/241 |
| 2006/0233131 A1* | 10/2006 | Gore et al. | 370/328 |
| 2007/0274343 A1* | 11/2007 | Nishio | 370/479 |

FOREIGN PATENT DOCUMENTS

| | | |
|---|---|---|
| CN | 1491049 A | 4/2004 |
| EP | 1578043 A1 | 9/2005 |
| JP | 2003-199173 A | 7/2003 |
| JP | 2004-208234 | 7/2004 |
| TW | 454394 | 9/2001 |
| TW | 200301629 A | 7/2003 |
| TW | 200406097 A | 4/2004 |
| TW | 200407041 A | 5/2004 |
| WO | 9949610 A1 | 9/1999 |

(Continued)

OTHER PUBLICATIONS

Lane, HyperStat Online—Standard Normal Distribution, Oct. 1, 2005, http://web.archive.org/web/20051001085751/davidmlane.com/hyperstat/A75494.html.*

(Continued)

*Primary Examiner* — Hoon J Chung
(74) *Attorney, Agent, or Firm* — Osha • Liang LLP

(57) ABSTRACT

A disclosed mobile station includes a wireless channel quality measuring unit configured to measure wireless channel quality; a wireless channel quality determining unit configured to determine to report the wireless channel quality to a base station if the wireless channel quality is greater than a threshold; and a transmission unit configured to report the wireless channel quality to the base station based on the determination result of the wireless channel quality determining unit.

6 Claims, 6 Drawing Sheets

FOREIGN PATENT DOCUMENTS

| WO | 03039030 A1 | 5/2003 |
|---|---|---|
| WO | 03047198 A2 | 6/2003 |
| WO | 03094384 A2 | 11/2003 |
| WO | 2005048490 A1 | 5/2005 |
| WO | 2005/096523 A1 | 10/2005 |

OTHER PUBLICATIONS

International Search Report w/translation from PCT/JP2006/325975 dated Apr. 17, 2007 (4 pages).

Written Opinion from PCT/JP2006/325975 dated Apr. 17, 2007 (4 pages).

3GPP TS25.214 V.6.7.1; "Physical Layer Procedures (FDD)"; Dec. 15, 2005 (60 pages).

3GPP TS25.302 V6.5.0; "Services Provided by the Physical Layer"; Sep. 2005 (75 pages).

3GPP TS25.308 V.6.3.0; "Overall Description"; Dec. 2004 (28 pages).

3GPP TR25.858 V5.0.0; "Physical Layer Aspects"; Mar. 2002 (31 pages).

3GPP TR.25.813, V0.1.0; "Radio Interface Protocol Aspects"; Nov. 2005 (19 pages).

3GPP TR25.814, V1.0.1; "Physical Layer Aspects for Evolved UTRA"; Nov. 2005 (72 pages).

esp@cenet Patent Abstract for Chinese Publication No. 1491049, publication date Apr. 21, 2004. (1 page).

Taiwanese Office Action for Application No. 095149188, mailed on Jun. 17, 2010 (9 pages).

Extended European Search Report for Application No. 06843359.8, mailed on May 7, 2012 (8 pages).

Soo-Yong Jeon et al, "Energy-Efficient Channel Quality Indication (CQI) Feedback Scheme for UMTS High-Speed Downlink Packet Access", Vehicular Technology Conference, 2005, vol. 1, Sep. 28, 2005, pp. 245-249.

* cited by examiner

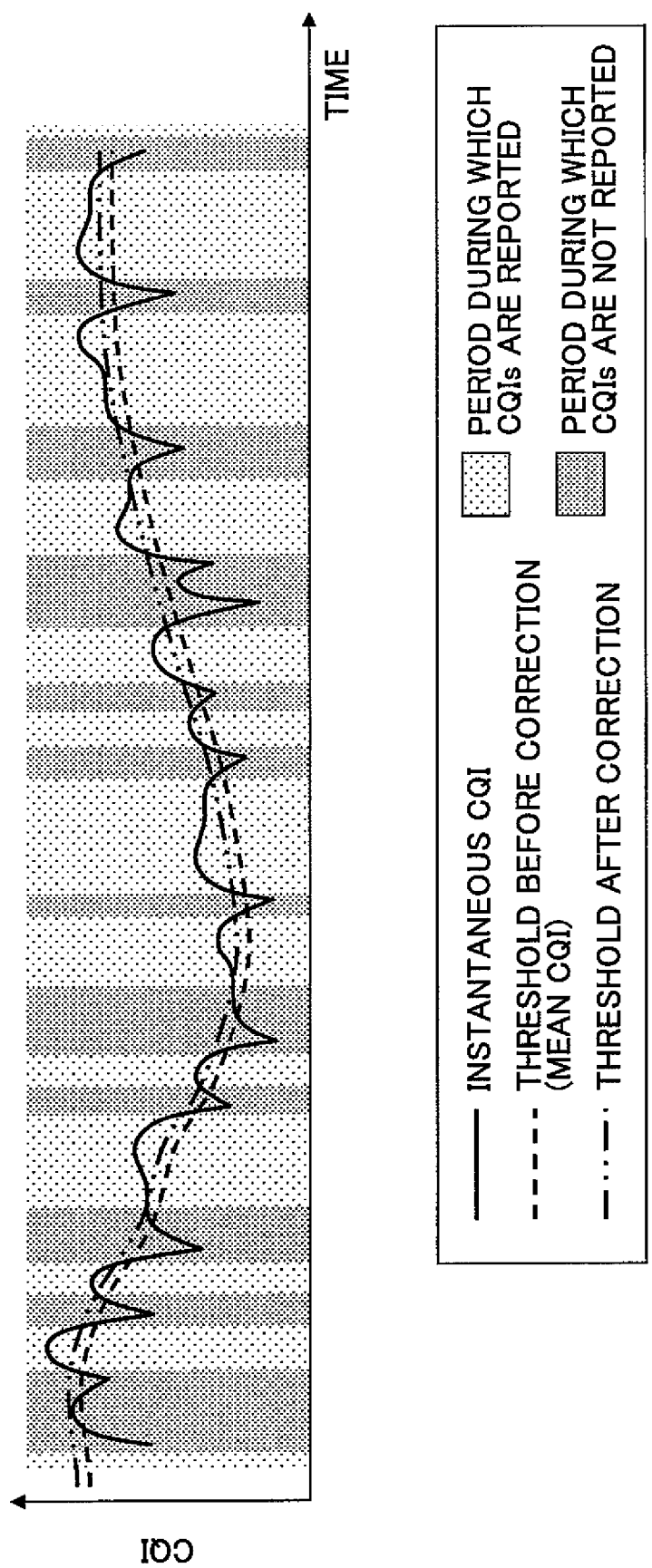

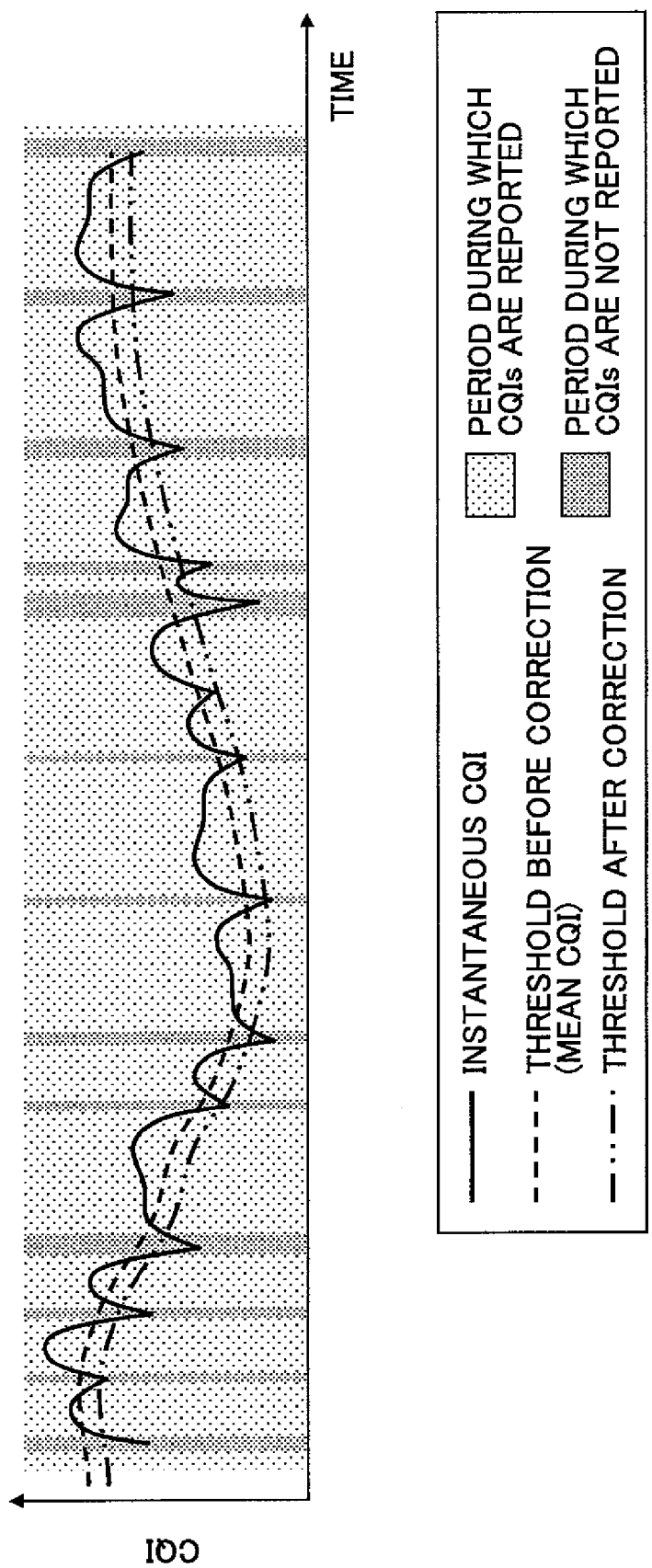

MOBILE STATION, BASE STATION, AND METHOD OF REPORTING WIRELESS CHANNEL QUALITY

TECHNICAL FIELD

The present invention generally relates to a mobile station, a base station, and a method of reporting wireless channel quality.

BACKGROUND ART

In a wireless system such as an HSDPA system, each mobile station frequently reports wireless channel quality (hereafter called a channel quality indicator (CQI)) to a base station so that the base station can perform link adaptation, e.g., transmission power control, adaptive modulation and coding (AMC), and fast packet scheduling among users, under fast fading environments.

For example, in an HSDPA system, the mobile station measures $E_c/I_0$ (receiver chip energy to interference power ratio) of a common pilot channel transmitted from the base station, quantizes the measured $E_c/I_0$ to 32 levels, and sends the quantized value as a CQI to the base station at intervals of 2 ms (or its integral multiple).

The base station compares CQIs sent from all mobile stations within its coverage area and selects a user whose data are to be transmitted in the next radio frame, for example, by performing fast packet scheduling.

Meanwhile, to improve frequency efficiency, the base station is preferably configured to select a user with a high CQI, i.e., a user in a good wireless channel condition. Therefore, in many systems, packet scheduling is performed taking into account CQI values.

As scheduling methods, maximum carrier-to-interference power ratio (Max C/I) and proportional fairness (PF) are widely used. In Max C/I, a user with the maximum CQI is always selected as long as there are transmission data. Accordingly, Max C/I has a disadvantage that it cannot select users in an equal manner. The method of improving frequency efficiency by selecting a user with a high CQI from multiple users is called multi-user diversity.

A user (i) selected by Max C/I is represented by formula (1) below.

$$i = \arg \max q_j(t) \quad (1)$$

wherein $q_j(t)$ represents the current CQI (instantaneous CQI) of the j-th user.

On the other hand, a user (i) selected by PF is represented by formula (2) below.

$$i = \arg \max(r_j(t)/R_j(t)) \quad (2)$$

wherein $r_j(t)$ represents a transmission rate corresponding to $q_j(t)$, and $R_j(t)$ represents a throughput up to the present time of the j-th user.

In formula (2), $r_j(t)$ increases as $q_j(t)$ increases. In other words, the better the propagation condition is, the larger $r_j(t)$ is. Thus, PF is a scheduling method that takes into account CQI values.

Formula (3) represents a variation of PF where CQIs are directly used.

$$i = \arg \max\{q_j(t) - Q_j(t)\} \quad (3)$$

wherein $Q_j(t)$ represents a mean value of $q_j(t)$.

A PF scheduler can achieve some degree of equality among users and provide high frequency efficiency. For this reason, many schedulers that can achieve more equality among users or that take into account delay time in a real-time service, such as a modified largest weighted delay first (M-LWDF) scheduler, are proposed based on the PF scheduler. Any of such schedulers takes into account CQI values.

DISCLOSURE OF INVENTION

Problems to be Solved by the Invention

However, the above background art technologies have disadvantages as described below.

In a wireless system such as an HSDPA system, each mobile station continuously and frequently sends CQIs to a base station, and the CQIs consume uplink radio resources.

Also, frequently sending CQIs quickly consumes the battery power of the mobile station. Further, frequently sending CQIs increases uplink interference. Thus, frequent transmission of CQIs reduces the quality and speed of data communications.

Meanwhile, in the UTRA LTE (long term evolution) system being standardized by 3GPP, the frequency band of the system is divided into multiple frequency blocks (chunks) and user packets are scheduled for each chunk.

To efficiently transmit packets by such frequency-based scheduling, it is essentially necessary for the mobile stations to send CQIs for each chunk. Accordingly, the CQIs themselves may consume a fairly large amount of radio resources.

Embodiments of the present invention make it possible to solve or reduce one or more problems caused by the limitations and disadvantages of the background art, and provide a mobile station, a base station, and a method of reporting wireless channel quality that can effectively reduce the number of CQIs to be sent.

Means for Solving the Problems

According to an embodiment of the present invention, a mobile station includes a wireless channel quality measuring unit configured to measure wireless channel quality; a wireless channel quality determining unit configured to determine to report the wireless channel quality to a base station if the wireless channel quality is greater than a threshold; and a transmission unit configured to report the wireless channel quality to the base station based on the determination result of the wireless channel quality determining unit.

With the above configuration, the mobile station can determine whether to report the wireless channel quality to the base station based on a threshold. For example, the mobile station may be configured to send a CQI to the base station when the reception quality of a downlink pilot channel is high and not to send a CQI when the reception quality is low.

According to another embodiment of the present invention, a base station includes a traffic measuring unit configured to measure the amount of traffic; a correction value calculation unit configured to calculate at least one of a threshold used by mobile stations to determine whether to report wireless channel quality and a correction value for the threshold; and a transmission unit configured to send at least one of the threshold and the correction value calculated by the correction value calculation unit to the mobile stations.

With the above configuration, the base station can calculate and send at least one of a threshold used by mobile stations to determine whether to report wireless channel quality and a correction value for the threshold.

According to still another embodiment of the present invention, a method of reporting wireless channel quality includes a reception step performed by a mobile station of receiving a downlink pilot channel; a wireless channel quality measuring step performed by the mobile station of measuring the wireless channel quality based on a reception quality of the downlink pilot channel; a wireless channel quality determining step performed by the mobile station of determining to report the wireless channel quality to a base station if the wireless channel quality is greater than a threshold; and a wireless channel quality transmission step performed by the mobile station of reporting the wireless channel quality to the base station based on the determination result of the wireless channel quality determining step.

With the above method, the mobile station can autonomously determine whether to report the wireless channel quality to the base station based on a threshold.

Advantageous Effect of the Invention

Embodiments of the present invention provide a mobile station, a base station, and a method of reporting wireless channel quality that can effectively reduce the number of CQIs to be sent.

BRIEF DESCRIPTION OF THE DRAWINGS

FIG. 1B is a graph used to describe operations of a wireless communication system (where a threshold is corrected when traffic is heavy or when transmission slot allocation frequency is low) according to an embodiment of the present invention;

FIG. 1C is a graph used to describe operations of a wireless communication system (where a threshold is corrected when traffic is light or when transmission slot allocation frequency is high) according to an embodiment of the present invention;

EXPLANATION OF REFERENCES

100 Mobile station
200 Base station

BEST MODE FOR CARRYING OUT THE INVENTION

The best mode for carrying out the invention is described based on the following embodiments with reference to the accompanying drawings.

Throughout the accompanying drawings, the same reference numbers are used for parts having the same functions, and overlapping descriptions of those parts are omitted.

A wireless communication system according to an embodiment of the present invention includes a base station and a mobile station.

In this embodiment, a mean value of CQIs of each user is used as a threshold. However, any other value may be used as the threshold.

Figure 1A:
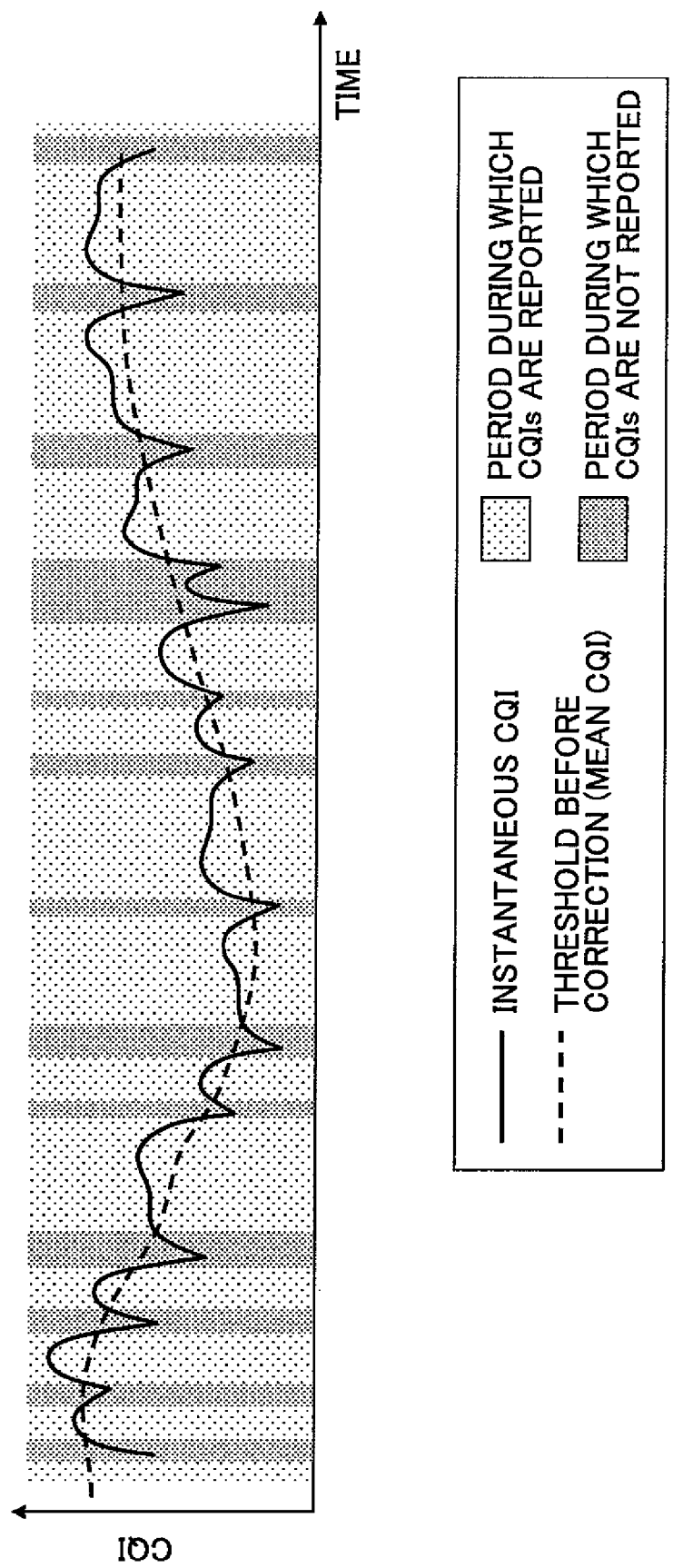
FIG. 1A is a graph used to describe operations of a wireless communication system (where a threshold is not corrected) according to an embodiment of the present invention.

In the wireless communication system of this embodiment, as shown in FIG. 1A, the mobile station compares an instantaneous value of a CQI (an instantaneous CQI) and a mean value of CQIs (a mean CQI) and thereby determines whether to send the CQI (turns on or off a switch for sending the CQI). In FIG. 1A, a solid line indicates the instantaneous CQI and a dotted line indicates the mean CQI. For example, the mobile station obtains an instantaneous CQI based on the reception quality of a downlink pilot channel. The mobile station sends a CQI when the instantaneous CQI is equal to or greater than the mean CQI, and does not send a CQI when the instantaneous CQI is less than the mean CQI.

Thus, the mobile station turns on a switch to send a CQI when the instantaneous CQI is equal to or greater than the mean CQI. This configuration allows the mobile station to refrain from sending a CQI when the instantaneous CQI is low and thereby makes it possible to reduce the sending frequency or the number of CQIs from the mobile station to the base station.

The mobile station may also be configured to correct the threshold as shown in FIGS. 1B and 1C. In FIGS. 1B and 1C, a solid line indicates the instantaneous CQI, a dotted line indicates the mean CQI, and a two-dot chain line indicates a threshold after correction.

For example, as shown in FIG. 1B, the threshold may be corrected according to the amount of network traffic. In this example, the mobile station increases the threshold by adding a predetermined value to the mean CQI when the amount of traffic in the base station is large. Increasing the threshold increases the probability that the instantaneous CQI becomes less than the threshold and therefore decreases the frequency of sending CQIs from the mobile station to the base station. In other words, increasing the threshold increases the amount of time during which the mobile station does not send CQIs.

If a mobile station sends a CQI to a base station when the network is congested, the chance of the mobile station being selected by the base station is low. In such a case, radio resources used by unselected mobile stations to send CQIs are wasted. This problem can be solved by increasing the threshold and thereby reducing the frequency of sending CQIs from the mobile station. In other words, with the above method, CQIs are sent only from mobile stations having a high probability of being selected.

A Max C/I or PF scheduler allocates a transmission slot to a user with a high. CQI to achieve the effect of multi-user diversity. In other words, no transmission slot is allocated to mobile stations sending low CQIs to the base station. Therefore, even if the mobile stations with low CQIs do not send the CQIs to the base station, the resulting frequency efficiency is substantially the same.

In the example shown in FIG. 1C, the mobile station decreases the threshold by subtracting a predetermined value from the mean CQI when the amount of traffic in the base station is small. Decreasing the threshold increases the probability that the instantaneous CQI becomes greater than the threshold and therefore increases the frequency of sending CQIs from the mobile station to the base station. In other words, decreasing the threshold increases the amount of time during which the mobile station sends CQIs.

If a mobile station sends a CQI to a base station when the network is not congested, the chance of the mobile station being selected by the base station is high. Therefore, when the network is not congested, it is preferable to decrease the threshold and thereby to increase the frequency of sending CQIs from the mobile station.

Take, for example, the PF method represented by formula (2). Because $R_j(t)$ represents a throughput up to the present time of a user, there is no practical problem even if CQI reports of the user are not complete. However, when the number of concurrent users is small (as an extreme example, when there is only one user) and transmission slot allocation frequency is high, it is necessary to increase the frequency of sending CQIs according to the allocation frequency. Correction values for the threshold are determined taking into account such situations.

For example, the base station measures the amount of traffic based on the number of concurrent users and/or the total amount of data in a buffer, determines a correction value based on the measured amount of traffic, and announces the correction value to mobile stations. Alternatively, the base station may be configured to send a correction value separately to each mobile station.

In this case, the mobile station may be configured to change a correction value to be applied based on the correction value sent from the base station. For example, the mobile station may be configured to obtain a correction value to be applied based on the correction value sent from the base station and QoS. Alternatively, a correction value to be applied may be obtained by the base station based on the QoS of each mobile station and sent to the mobile station.

Further, the mobile station may be configured to measure transmission slot allocation frequency at which transmission slots are allocated to the mobile station and to autonomously obtain the correction value based on the measured transmission slot allocation frequency. As the amount of traffic increases, the downlink transmission slot allocation frequency (scheduling frequency) for each user decreases. Therefore, the mobile station can autonomously obtain the correction value based on the transmission slot allocation frequency.

Meanwhile, the base station may be configured to determine that a mobile station is in a bad propagation condition while CQIs are not sent from the mobile station, and to refrain from allocating (or scheduling) transmission slots for the mobile station. This configuration makes it possible to reduce the number of users that the scheduler of the base station has to handle and thereby to reduce the processing load of the scheduler. Also, because no transmission slot is allocated to a mobile station while the mobile station is not sending CQIs, the mobile station can perform discontinuous reception (DRX) during that time. In other words, the mobile station can conserve some battery power by performing DRX after sending a CQI and until the CQI is reflected in the transmission slot allocation or the AMC, because there is a slight delay before the CQI sent to the base station is reflected in the downlink signal.

A mobile station according to an embodiment of the present invention is described below with reference to FIG. 2.

The mobile station of this embodiment obtains the mean value and variance of CQIs and normalizes a measured CQI using the mean value and the variance. In this embodiment, announcement information sent from a base station 200 includes a threshold. A mobile station 100 obtains the threshold from the announcement information and compares the normalized CQI with the threshold.

The mobile station 100 of this embodiment includes an antenna 102; a transmitter-receiver shared unit 104 connected to the antenna 102; an RF receiver 106 to which an output signal is input from the transmitter-receiver shared unit 104; a CQI measuring unit 108 used as a wireless channel quality measuring unit and a threshold receiving unit 110 to each of which an output signal is input from the RF receiver 106; a threshold setting unit 112 to which an output signal is input from the threshold receiving unit 110; a normalized CQI calculation unit 114 used as a normalization unit and a switch 118 both connected to the CQI measuring unit 108; a determining unit 116 used as a wireless channel quality determining unit to which output signals are input from the normalized CQI calculation unit 114 and the threshold setting unit 112; an RF transmitter 122 connected to the transmitter-receiver shared unit 104; and a multiplexing unit 120 connected to the RF transmitter 122 and the switch 118. The switch 118, the multiplexing unit 120, and the RF transmitter 122 form a transmission unit.

The switch 118 is controlled based on an output signal from the determining unit 116.

The RF receiver 106 receives a downlink signal from the base station 200.

The CQI measuring unit 108 determines the wireless channel quality based on a signal, such as a common pilot channel, sent from the base station 200. For example, the CQI measuring unit 108 measures a CQI.

The normalized CQI calculation unit 114 normalizes the wireless channel quality, e.g., the CQI, measured by the CQI measuring unit 108. On average, a CQI of a mobile station near a base station is higher than that of a mobile station near the edge of the cell. In a system where each mobile station determines whether to send a CQI based on the result of comparing the measured CQI and a threshold, it is likely that a mobile station near a base station sends CQIs more frequently than a mobile station near the edge of the cell. This variation in the CQI-sending frequency depending on the location of a mobile station can be reduced by normalizing the measured CQI.

For example, the normalized CQI calculation unit 114 calculates the mean value and variance of CQIs and normalizes a measured CQI according to formula (4) below.

$$\text{Normalized CQI} = (\text{measured CQI} - \text{mean CQI}) / \sqrt{Var(\text{measured CQIs})} \quad (4)$$

The threshold receiving unit 110 extracts a threshold from the announcement information. Alternatively, the threshold receiving unit 110 may be configured to receive a threshold separately sent to each mobile station.

The threshold setting unit 112 sets the threshold extracted by the threshold receiving unit 110 in the determining unit 116.

The determining unit 116 compares the normalized CQI and the threshold and turns on or off the switch 118 based on the comparison result. For example, when the normalized CQI is equal to or greater than the threshold, the determining unit 116 turns on the switch 118 to send the measured CQI to the base station 200. On the other hand, when the normalized CQI is less than the threshold, the determining unit 116 turns off the switch 118 to stop sending the measured CQI to the base station 200.

When the switch 118 is turned on, the multiplexing unit 120 multiplexes the measured CQI and other uplink signals, such as uplink user data, and inputs the multiplexed signal to the RF transmitter 122.

The RF transmitter 122 converts the multiplexed signal to a radio frequency signal and sends the converted signal to the antenna 102. As a result, the measured CQI is sent to the base station 200.

Next, operations of the mobile station 100 are described.

When the RF receiver 106 receives a downlink signal from the base station 200, the received signal is input to the CQI measuring unit 108, and wireless channel quality is measured by the COI measuring unit 108.

The measured wireless channel quality is input to the normalized CQI calculation unit 114 for normalization.

Meanwhile, the threshold receiving unit 110 extracts a threshold from the announcement information and inputs the threshold to the threshold setting unit 112.

The threshold setting unit 112 sets the threshold extracted by the threshold receiving unit 110 in the determining unit 116.

The determining unit 116 compares the normalized CQI and the threshold and turns on or off the switch 118 based on the comparison result. For example, when the normalized CQI is equal to or greater than the threshold, the determining unit 116 turns on the switch 118 to send the measured CQI to the base station 200. Or, when the normalized COI is less than the threshold, the determining unit 116 turns off the switch 118 to stop sending the measured CQI to the base station 200.

When the switch 118 is turned on, the multiplexing unit 120 multiplexes the measured CQI and other uplink signals, such as uplink user data, and inputs the multiplexed signal to the RF transmitter 122.

The RF transmitter 122 converts the multiplexed signal to a radio frequency signal and sends the converted signal to the antenna 102. As a result, the measured CQI is sent to the base station 200.

In the above exemplary process, the measured CQI is normalized and the normalized CQI is compared with the threshold. Alternatively, the mobile station 100 may be configured to compare the measured CQI with the threshold.

Figure 3:
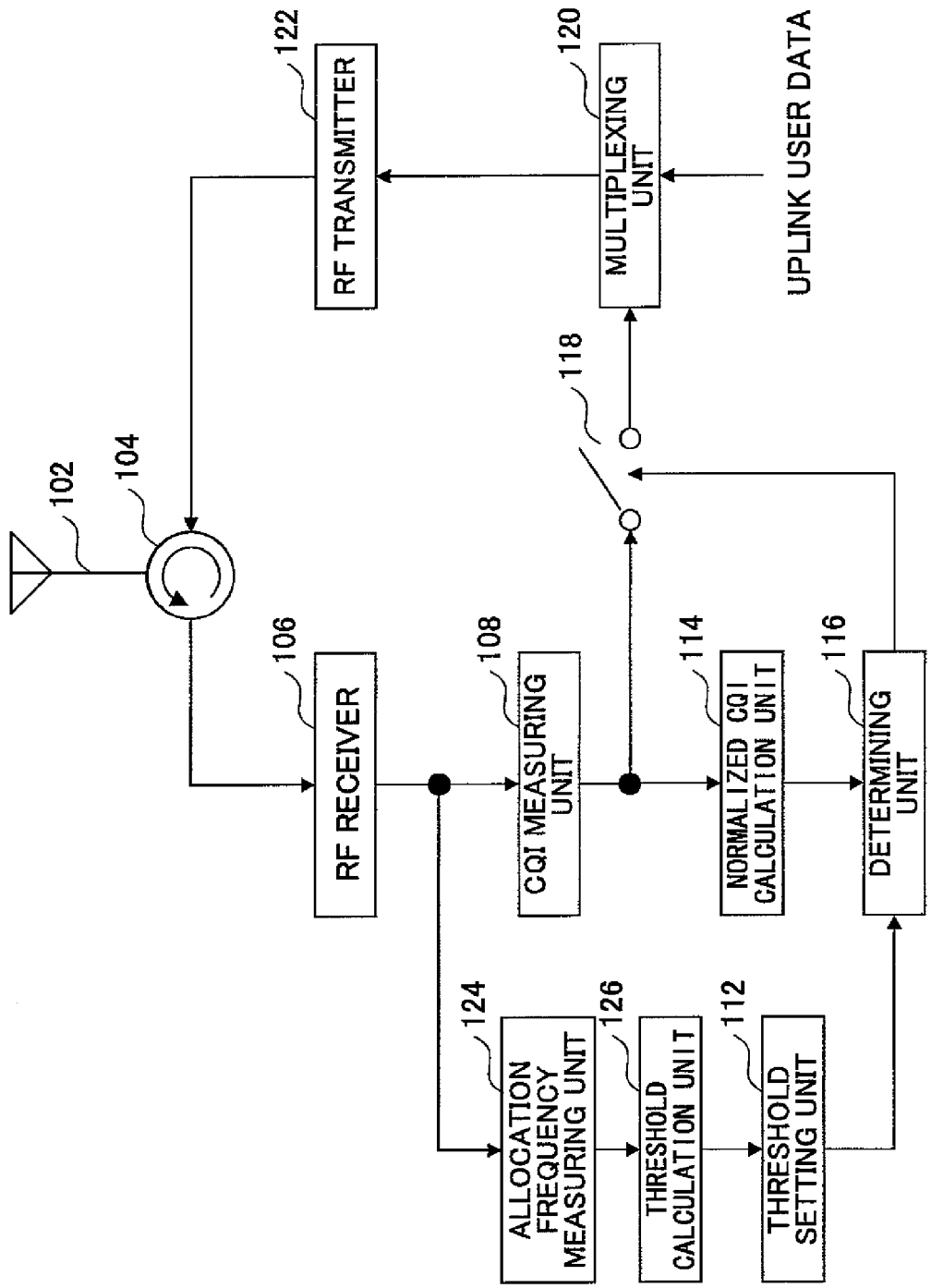
FIG. 3 is a block diagram illustrating a part of a mobile station according to another embodiment of the present invention.

A mobile station 100 according to another embodiment of the present invention is described below with reference to FIG. 3.

Figure 2:
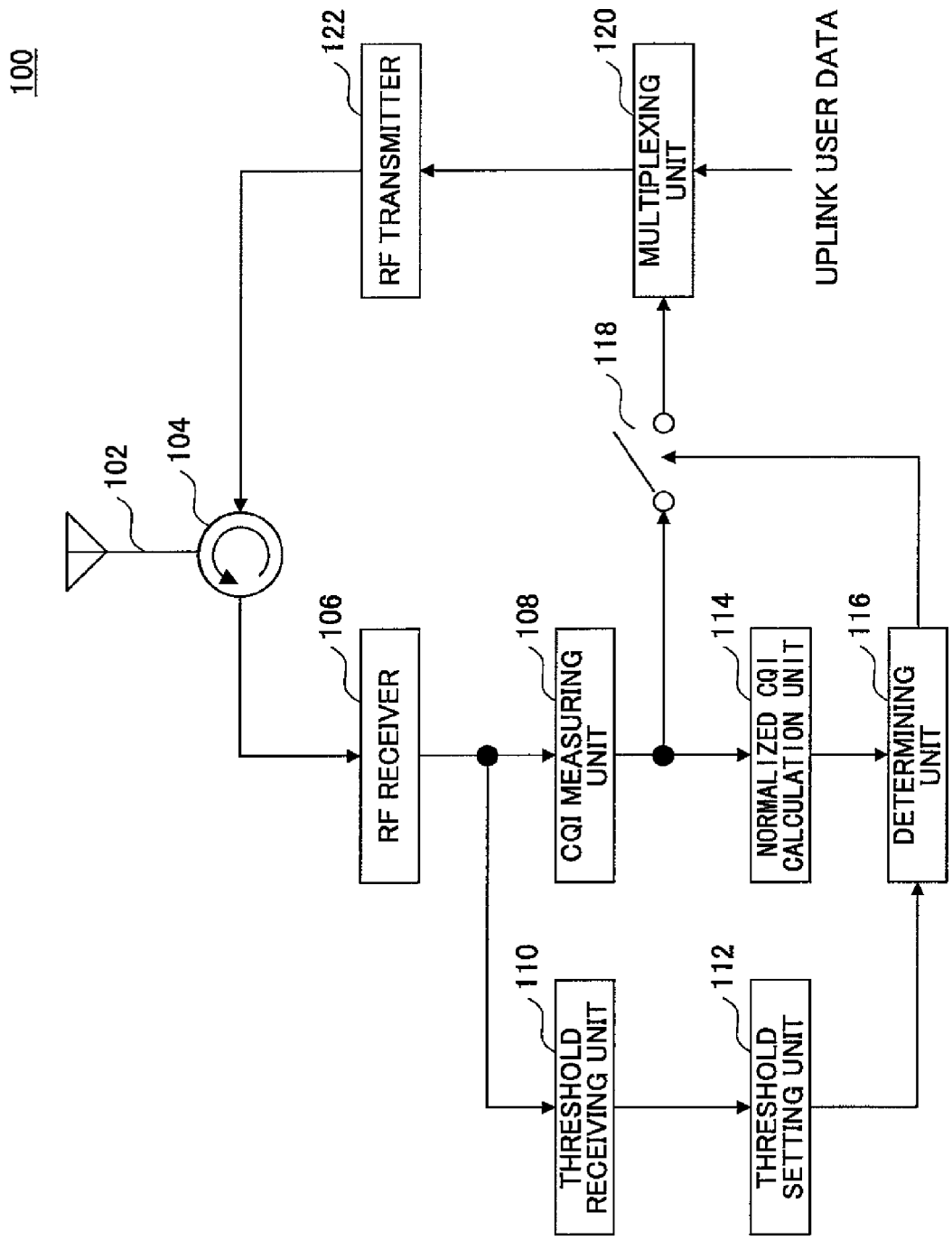
FIG. 2 is a block diagram illustrating a part of a mobile station according to an embodiment of the present invention.

The mobile station 100 of this embodiment is different from the mobile station shown in FIG. 2 in that the threshold receiving unit 110 is replaced with an allocation frequency measuring unit 124 used as a transmission slot allocation frequency measuring unit, and that a threshold calculation unit 126 connected to the allocation frequency measuring unit 124 and the threshold setting unit 112 is newly added.

The mobile station 100 of this embodiment measures transmission slot allocation frequency and changes the threshold value based on the measured transmission slot allocation frequency. With this configuration, it is not necessary to send a threshold and/or a correction value from the base station 200 to the mobile station 100.

The allocation frequency measuring unit 124 measures transmission slot allocation frequency at which transmission slots are allocated to the mobile station 100 and inputs the measured allocation frequency to the threshold calculation unit 126.

The threshold calculation unit 126 calculates a threshold based on the allocation frequency. For example, the threshold calculation unit 126 decreases the threshold when the allocation frequency is high and increases the threshold when the allocation frequency is low.

Figure 4:
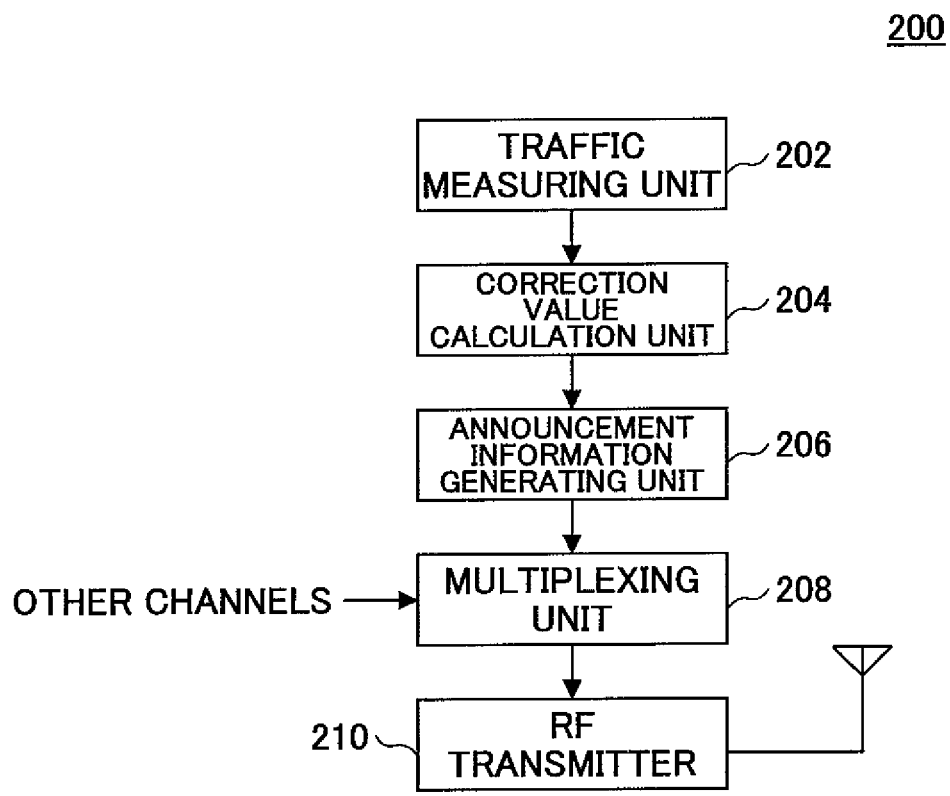
FIG. 4 is a block diagram illustrating a part of a base station according to an embodiment of the present invention.

The base station 200 according to an embodiment of the present invention is described below with reference to FIG. 4.

The base station 200 of this embodiment includes a traffic measuring unit 202, a correction value calculation unit 204 to which an output signal is input from the traffic measuring unit 202, an announcement information generating unit 206 to which an output signal is input from the correction value calculation unit 204, a multiplexing unit 208 to which an output signal is input from the announcement information generating unit 206, and an RF transmitter 210 to which an output signal is input from the multiplexing unit 208.

The traffic measuring unit 202 estimates the amount of traffic based on, for example, transmission power, the number of concurrent users, and the amount of data in a transmit buffer.

The correction value calculation unit 204 calculates a correction value for the threshold based on the amount of traffic. For example, based on the amount of traffic, the correction value calculation unit 204 calculates a correction value for the threshold used by the mobile station 100 to determine whether to report wireless channel quality.

Alternatively, in a case where the threshold is not calculated by the mobile station 100, the correction value calculation unit 204 may be configured to calculate the threshold itself for use by the mobile station 100 to determine whether to report wireless channel quality.

The announcement information generating unit 206 generates announcement information including at least one of the correction value and the threshold calculated by the correction value calculation unit 204.

The multiplexing unit 208, for example, multiplexes the announcement information and information of other channels, and inputs the multiplexed signal to the RF transmitter 210.

The RF transmitter 210 converts the multiplexed signal to a radio frequency signal and sends the converted signal to the antenna. As a result, the correction value is sent to the mobile station 100.

Thus, embodiments of the present invention make it possible to effectively reduce the number of CQIs sent from the mobile station 100 to the base station 200. This in turn makes it possible to conserve the battery power of the mobile station and to reduce uplink interference. Also, the above embodiments make it possible to reduce the number of users that the scheduler of the base station has to handle and thereby to reduce the processing load of the scheduler.

The present international application claims priority from Japanese Patent Application No. 2005-379987 filed on Dec. 28, 2005, the entire contents of which are hereby incorporated herein by reference.

INDUSTRIAL APPLICABILITY

A mobile station, a base station, and a method of reporting wireless channel quality according to embodiments of the present invention may be applied to a wireless communication system.

The invention claimed is:

1. A wireless communication system, comprising:
   a mobile station comprising:
      a wireless channel quality measuring unit configured to measure wireless channel quality,
      a wireless channel quality determining unit configured to determine whether to report the wireless channel quality to a base station based on a threshold,
      a transmission unit configured to transmit the wireless channel quality to the base station based on the determination result of the wireless channel quality determining unit, and
      a normalization unit configured to normalize the wireless channel quality based on a mean value and variance of previous measurements of the wireless signal quality,
      wherein the wireless channel quality determining unit is configured to determine to report the wireless channel quality to the base station if the normalized wireless channel quality is greater than the threshold; and
   a base station comprising:
      a traffic measuring unit configured to measure the amount of traffic,
      a correction value calculation unit configured to calculate at least one of the threshold used by the mobile station to determine whether to report the wireless channel quality and a correction value for the threshold based on the amount of traffic, and a transmission unit configured to send at least one of the threshold and the correction value calculated by the correction value calculation unit to the mobile station, wherein the traffic measuring unit is configured to measure the amount of traffic based on total transmission power and the amount of data in a transmit buffer.

2. The wireless communication system as claimed in claim 1, the mobile station further comprising:

a transmission slot allocation frequency measuring unit configured to measure transmission slot allocation frequency at which transmission slots are allocated to the mobile station; and a threshold calculation unit configured to calculate the threshold based on the measured transmission slot allocation frequency.

3. The wireless communication system as claimed in claim 1, the mobile station further comprising:

a threshold receiving unit configured to receive information indicating the threshold.

4. The wireless communication system as claimed in claim 3, wherein the wireless channel quality determining unit of the mobile station is configured to correct the threshold based on QoS.

5. The wireless communication system as claimed in claim 1, wherein the transmission unit of the base station is configured to send the threshold separately to each of a plurality of mobile stations including the mobile station.

6. A method of reporting wireless channel quality, comprising:

measuring wireless channel quality in a wireless channel quality measuring unit in a mobile station;

determining, in a wireless channel quality determining unit in the mobile station, whether to report the wireless channel quality to a base station based on a threshold;

transmitting, from a transmission unit in the mobile station, the wireless channel quality to the base station based on the determination result of the wireless channel quality determining unit;

normalizing the wireless channel quality, in a normalization unit in the mobile station, based on a mean value and variance of previous measurements of the wireless signal quality, wherein the wireless channel quality determining unit is configured to determine to report the wireless channel quality to the base station if the normalized wireless channel quality is greater than the threshold;

measuring the amount of traffic in a traffic measuring unit in a base station;

calculating, in a correction value calculation unit in the base station, at least one of the threshold used by the mobile station to determine whether to report the wireless channel quality and a correction value for the threshold based on the amount of traffic; and sending, from a transmission unit in the based station, at least one of the threshold and the correction value calculated by the correction value calculation unit to the mobile station, wherein the traffic measuring unit is configured to measure the amount of traffic based on total transmission power and the amount of data in a transmit buffer.

* * * * *